United States Patent
Bayat et al.

(10) Patent No.: US 10,845,665 B1
(45) Date of Patent: Nov. 24, 2020

(54) DEVICES WITH GUEST-HOST LIQUID CRYSTAL MODULATORS

(71) Applicant: Apple Inc., Cupertino, CA (US)

(72) Inventors: Khadijeh Bayat, San Jose, CA (US); Cheng Chen, San Jose, CA (US); Ibuki Kamei, San Jose, CA (US); Shih-Wei Chang, San Jose, CA (US); Avery P. Yuen, San Jose, CA (US); Zhibing Ge, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 549 days.

(21) Appl. No.: 15/295,142

(22) Filed: Oct. 17, 2016

Related U.S. Application Data

(60) Provisional application No. 62/289,810, filed on Feb. 1, 2016.

(51) Int. Cl.
*E06B 9/24* (2006.01)
*G02F 1/137* (2006.01)

(52) U.S. Cl.
CPC .......... *G02F 1/13725* (2013.01); *E06B 9/24* (2013.01); *E06B 2009/2417* (2013.01)

(58) Field of Classification Search
CPC . G02F 1/1313; G02F 1/137525; G02B 5/208; B32B 17/10036; B32B 17/10504
USPC .......................................................... 349/16
See application file for complete search history.

(56) References Cited

U.S. PATENT DOCUMENTS

| | | | |
|---|---|---|---|
| 4,632,514 A * | 12/1986 | Ogawa | G02F 1/133371 349/107 |
| 4,896,945 A * | 1/1990 | Ooba | G02F 1/134309 349/110 |
| 5,523,877 A | 6/1996 | Lynam | |
| 6,033,742 A * | 3/2000 | Iwanaga | C09B 1/585 428/1.31 |
| 6,055,088 A | 4/2000 | Fix et al. | |
| 6,596,398 B1 | 7/2003 | Russo et al. | |
| 6,625,875 B2 | 9/2003 | Sol | |
| 7,927,706 B2 | 4/2011 | Fisher | |
| 8,610,992 B2 | 12/2013 | Varaprasad et al. | |
| 8,613,822 B2 | 12/2013 | Van Nutt et al. | |
| 9,052,456 B2 | 6/2015 | Hassan | |
| 2010/0316852 A1 | 12/2010 | Condo et al. | |
| 2011/0096253 A1 | 4/2011 | Zhang et al. | |
| 2013/0279000 A1 | 10/2013 | Maeda et al. | |
| 2014/0176836 A1* | 6/2014 | Brecht | B32B 17/10036 349/16 |

(Continued)

*Primary Examiner* — Thanh Nhan P Nguyen
(74) *Attorney, Agent, or Firm* — Treyz Law Group, P.C.; G. Victor Treyz; Michael H. Lyons

(57) ABSTRACT

A window may be provided with a light modulator. The light modulator may be dynamically adjusted to control visible light transmission through the window. The window may also have layers that selectively block light with non-visible wavelengths. The light-blocking layers may block ultraviolet light, near infrared light such as light from solar radiation, and far infrared light such as heat produced due to the absorption of visible light by the light modulator. The light modulator may be a guest-host liquid crystal light modulator. The guest-host liquid crystal light modulator may have a layer of liquid crystal material with dye that is interposed between polymer substrate layers. The polymer substrate layers may be thermoplastic layers that are moldable to conform to window shapes with compound curves.

19 Claims, 18 Drawing Sheets

(56) References Cited

U.S. PATENT DOCUMENTS

2015/0362802 A1\* 12/2015 Wu .................. G02F 1/133711
349/106

\* cited by examiner

DEVICES WITH GUEST-HOST LIQUID CRYSTAL MODULATORS

This application claims the benefit of provisional patent application No. 62/289,810, filed on Feb. 1, 2016, which is hereby incorporated by reference herein in its entirety.

BACKGROUND

This relates generally to light modulators, and, more particularly, to devices with liquid crystal light modulators.

Mechanical shutters and electronic shutters have been used to control the transmission of light. For example, movable mechanical sunshades have been used to control the amount of light that passes through the windows of a building or vehicle. Electrochromic devices have also been used to control the amount of light that passes through windows. Electrochromic devices exhibit light transmission values that can be varied as a function of applied voltage. This allows electronic signals to be used to vary light transmission in place of the movement of mechanical systems.

It can be challenging to form a window light modulator with desired properties. If care it not taken, modulation speed will be too slow, light transmission in wavelength ranges of interest will be different than desired, and excessive haze or other optical defects will be present.

It would therefore be desirable to be able to provide improved light modulators.

SUMMARY

A window may be provided with a light modulator. The light modulator may be dynamically adjusted to control visible light transmission through the window.

The window may also have layers that selectively block light with non-visible wavelengths. The light-blocking layers may block ultraviolet light, near infrared light such as light from solar radiation, and far infrared light such as heat produced due to the absorption of visible light by the light modulator. The light-blocking layers may have multiple layers of crystalline metal on multiple respective crystalline oxide seed layers. Barrier layers may be formed between the metal layers and the oxide seed layers.

The light modulator may be a guest-host liquid crystal light modulator. The guest-host liquid crystal light modulator may have a layer of liquid crystal material with dye that is interposed between polymer substrate layers. The polymer substrate layers may be thermoplastic layers that are moldable to conform to window shapes with compound curves.

DETAILED DESCRIPTION

Figure 1:
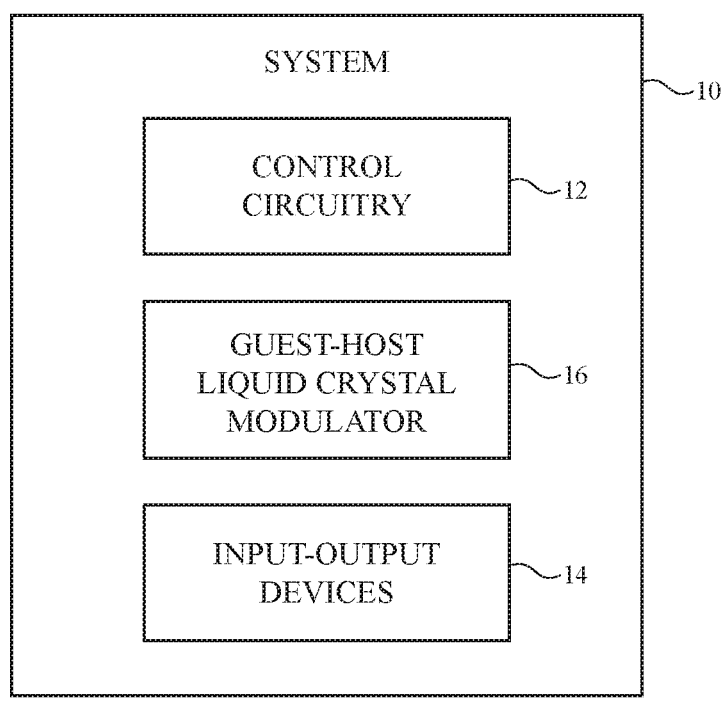
FIG. 1 is a schematic diagram of an illustrative system that includes a light modulator such as a liquid crystal light modulator in accordance with an embodiment.

A light modulator may be used to control the amount of light passing through a window or other transparent structure. An illustrative system of the type that may be provided with a window having a light modulator is shown in FIG. 1. System 10 of FIG. 1 may be an electronic device such as a computer or other equipment with a display, touch sensor, or other component that includes one or more transparent electrodes, may be an electronic device such as a computer or other electronic equipment having a camera or other component that senses light through structures having one or more transparent electrodes, may be an automobile, truck, airplane, or other vehicle that has windows through which it is desired to control light transmission, may be a building with windows through which it is desired to control light transmission, or may be other system that includes a window or other transparent structure through which light transmission is controlled. The use of light modulators to control the transmission of light through transparent structures such as windows (e.g., windows in building and vehicles) may sometimes be described herein as an example. This is, however, merely illustrative. Light modulators may be used in controlling light transmission through any suitable structures.

As shown in FIG. 1, system 10 may include control circuitry 12. Control circuitry 12 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 12 may be used to control the operation of device 10. The processing circuitry may be based on one or more microprocessors, microcontrollers, digital signal processors, baseband processors, power management units, audio chips, application specific integrated circuits, etc.

In some configurations, system 10 may include input-output devices 14 that allow data to be supplied to system 10 and that allow data to be provided from system 10 to external systems. Input-output devices 14 may include buttons, joysticks, scrolling wheels, touch pads, key pads, keyboards, microphones, speakers, tone generators, vibrators, cameras, sensors, light-emitting diodes and other status indicators, data ports, etc. A user can control the operation of this type of system by supplying commands through input-output devices 14 and may receive status information and other output from the system using the output resources of input-output devices 14. If desired, input-output devices 14 may include one or more displays (e.g., organic light-emitting diode displays and other displays with arrays of light-emitting diodes, liquid crystal displays, electrophoretic displays, etc.). Displays may be touch screen displays that include a touch sensor for gathering touch input from a user or may be insensitive to touch. A touch sensor for a display may be based on an array of capacitive touch sensor electrodes, acoustic touch sensor structures, resistive touch components, force-based touch sensor structures, a light-based touch sensor, or other suitable touch sensor arrangements.

System 10 may include one or more light modulators. The light modulators may modulate the amount of light transmission through a window or other structure in response to control signals from control circuitry 12. The light modulator may be any suitable electrically controlled light modulator. With one suitable arrangement, which is sometimes described herein as an example, system 10 may have a light modulator such as guest-host liquid crystal modulator 16. Based on information from input-output devices 14 and/or other information, control circuitry 12 may apply signals to guest-host liquid crystal modulator 16 that direct modulator 16 to increase or decrease light transmission through modulator 16.

Figure 2:
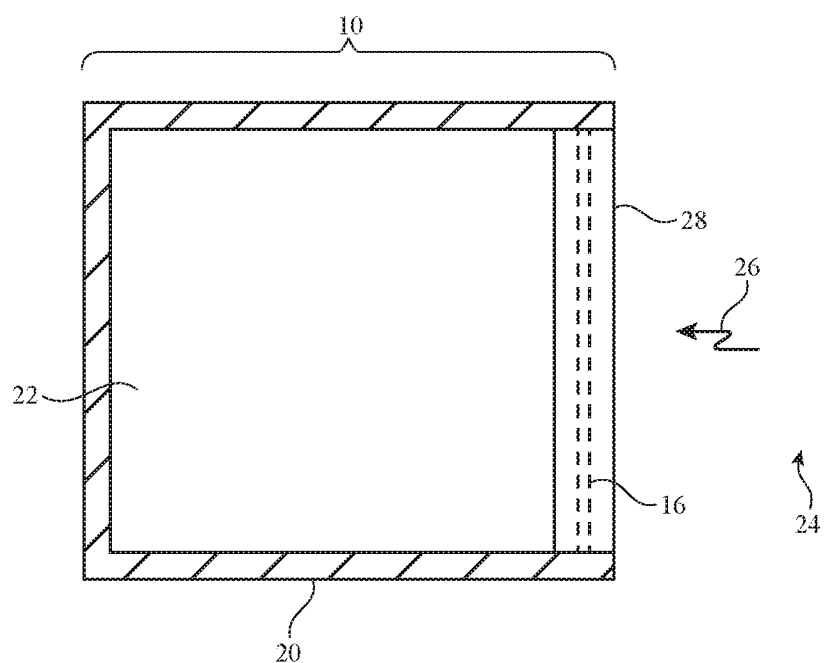
FIG. 2 is a cross-sectional side view of an illustrative system with a window having a light modulator that serves as an interface between an interior portion of the system and the exterior environment surrounding the system in accordance with an embodiment.

Light modulator 16 may be incorporated into a window in system 10. As shown in FIG. 2, for example, light modulator 16 may be incorporated into window 28 in structures 20. Structures 20 may form walls in a building, the body of a vehicle, walls in a container, or other support structures for the window 28. Window 28 in structures 20 separates interior 22 from exterior 24. Examples of windows 28 that may include light modulators such as light modulator 16 include office building windows, windows in a home, vehicle windows such as a sunroof window in an automobile or truck, side and rear vehicle windows in an automobile or truck, or a strip-shaped part of a window such as an upper strip along the front window in an automobile or truck, window portions with other shapes on the front, rear, and/or side windows portions of side and rear windows. There may be one or more windows 28 with light modulators in system 10. The arrangement of FIG. 2 is merely illustrative.

Light modulator 16 may dynamically control the transmission of light from exterior 24 to interior 22 and from interior 22 to exterior 24. For example, when it is desired to dim a room in a building, the visible light transmission of light modulator 16 may be decreased to decrease the amount of light 26 that is passing from exterior 24 to interior 22. When it is desired to let more light pass into interior 22, light modulator 16 may be adjusted to increase the visible light transmission of light modulator 16.

Window 28 may contain one or more low-emissivity glass layers (sometimes referred to as low-e glass layers). The low-e glass of window 28 may exhibit low amounts of light transmission at infrared wavelengths. This type of infrared light blocking configuration may help avoid excessive heat transmission to interior 22. For example, near-infrared light components of solar radiation in light 26 may be blocked by the low-e glass of window 28 rather than being passed into interior 22. Visible light in light 26 that is blocked by modulator 16 may be emitted as far-infrared light (heat). The low-e glass of window 28 may also help block this far-infrared light. By blocking near-infrared and far-infrared light, low-e glass in window 28 may help reduce solar heat build up in the interior of a building, the interior of a vehicle, or the interior of a container or other structure.

Figure 3:
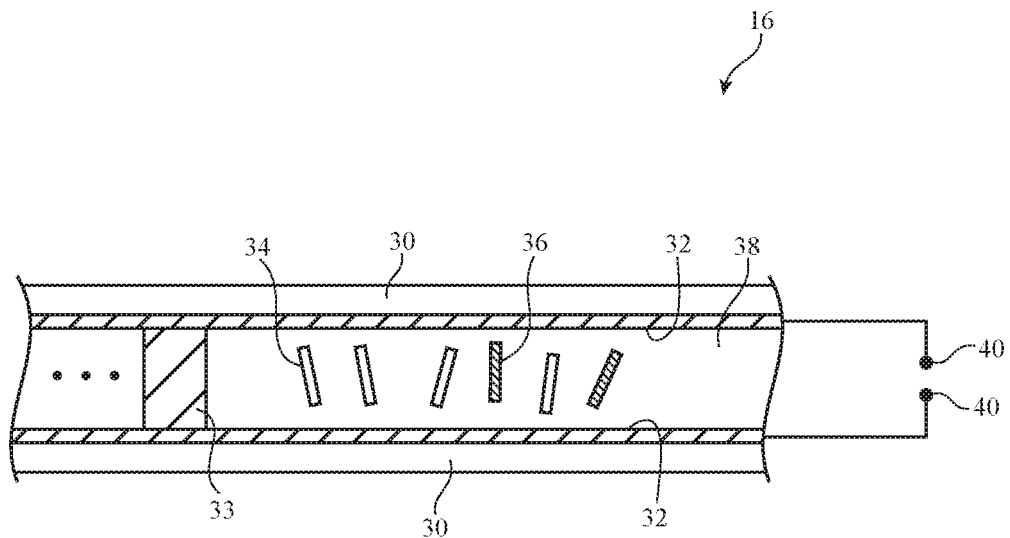
FIG. 3 is a cross-sectional side view of an illustrative guest-host liquid crystal light modulator in accordance with an embodiment.

A cross-sectional side view of an illustrative light modulator is shown in FIG. 3. Light modulator 16 of FIG. 3 has transparent substrate layers 30 with conductive coatings that form electrodes 32. The inner surfaces of electrodes 32 may be provided with a coating (rubbing layer) to help orient liquid crystal molecules in liquid crystal layer 38. Liquid crystal layer 38 may be interposed between substrate layers 30. Spacer structures such as spacer 33 may be used to ensure that layers 30 and electrodes 32 are separated from each other by a desired distance (i.e., spacers 33 may ensure that the separation between layers 30 and therefore the thickness of layer 38 has a value of about 5-15 microns or other suitable thickness). Spacers 33 may be formed from embossed features on substrate 30, photolithographically formed structures on substrate 30, microspheres, or other suitable spacer structures.

Figure 4:
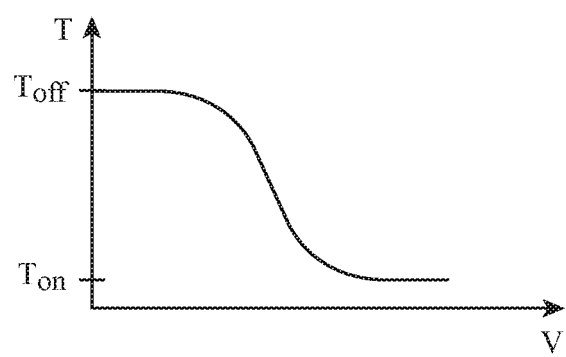
FIG. 4 is a graph in which light transmission has been plotted as a function of applied voltage to a light modulator in accordance with an embodiment.

During operation, control signals may be applied to electrodes 32 from control circuitry 12 via terminals 40. The control signals may control the transmission T of modulator 16. For example, transmission T may be adjusted from a high level when the applied voltage V across terminals 40 is small to a low level when the applied voltage V across terminals 40 is high, as shown in the graph of FIG. 4. Voltage V may be, for example, an alternating current (AC) voltage.

Layers 30 may be formed from glass, plastic, ceramic, or other material. Layers 30 may, for example, be formed from transparent glass (e.g., glass that is transparent in visible wavelengths). If desired, layers 30 may be formed from plastic. For example, layers 30 may be plastic layers such as clear sheets of polycarbonate or other thermoplastic material. The thermoplastic sheets may be transparent at visible wavelengths. When formed from thermoplastic material, layers 30 may be molded into a desired shape under heat and pressure. For example, layers 30 may be molded into a shape having compound curves (e.g., in a configuration in which window 28 has glass layers with compound curves). The thickness of layers 30 may be about 100-300 microns, more than 150 microns, less than 250 microns, or other suitable thickness.

Liquid crystal modulator 16 may be a guest-host liquid crystal modulator. Liquid crystal layer 38 of guest-host liquid crystal modulator 16 may include liquid crystal molecules 34 (e.g., host molecules) and dye molecules 36 (e.g., guest molecules) that are rotated when molecules 34 are rotated by applied electric fields. Any suitable guest-host system may be used for liquid crystal layer 38 of modulator 16. With one suitable arrangement, which may sometimes be described herein as an example, modulator 16 may contain a vertical alignment layer (e.g., a polyimide rubbing layer) on the inner surfaces of electrodes 32 to orient liquid crystal molecules 34 vertically in the absence of applied electric field to electrodes 40. Dye molecules 36 may be associated with a dichroic dye having a concentration of about 1-2%, more than 0.5%, or less than 4%. Dye molecules 36 may include a mixture of two or more dyes. For example, the dye formed from molecules 36 may include a first dye such as an azo dye that exhibits a satisfactory contrast ratio (ratio between high and low light transmission) and a second dye such as an anthraquinone dye (a small molecule dye) that exhibits a satisfactory stability under exposure to light (e.g., ultraviolet light). The color of modulator 16 may be adjusted by selecting an appropriate mixture of dyes. For example, a black dye (e.g., a black azo dye) may be formed from 5-10 colored dyes that have a black appearance when combined.

Figure 5:
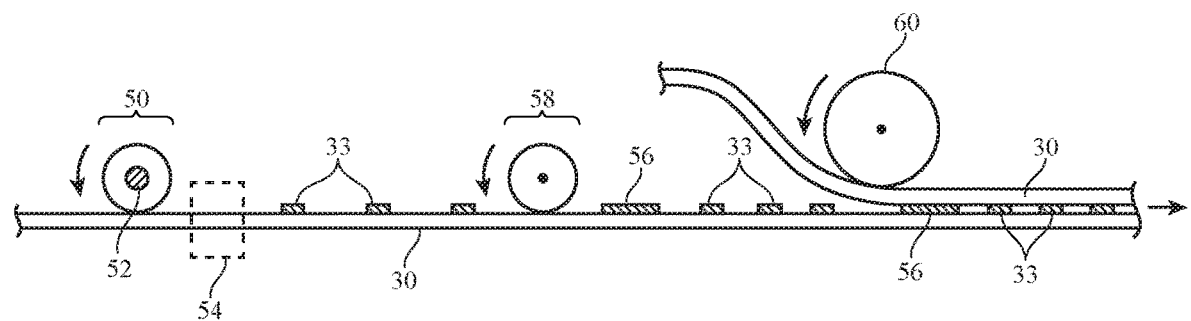
FIG. 5 is a cross-sectional side view of illustrative equipment for fabricating a guest-host liquid crystal light modulator in accordance with an embodiment.

Illustrative equipment for forming modulator 16 is shown in FIG. 5. In the example of FIG. 5, a continuous modulator layer 16 is being produced using a roll-based process. Other types of fabrication techniques may be used. The use of a roll-based process may help enhance production throughput.

With the illustrative arrangement of FIG. 5, lower and upper substrate portions 30 are attached to each other using rollers such as roller 60. Before laminating substrates 30 to each other, the lower substrate 30 may be provided with spacers 33 using equipment 50 and 54. Equipment 50 may include a rotating hollow drum with a central cylindrical photomask through which ultraviolet light exposes a layer of photoresist on the surface of substrate 30 so that subsequent development with photoresist development equipment 54 may form spacers 33. If desired, spacers 33 may be formed by embossing techniques (e.g., using depressed portions on the drum of equipment 50 to create corresponding raised portions in substrate 30 that serve as spacers 33). Spacers 33 may also be formed by ink-jet printing, gravure printing, or other printing techniques (e.g., techniques in which liquid polymer is printed onto the surface of substrate 30 and cured by heat and/or application of ultraviolet light), by incorporating microspheres or other spacer structures, or by otherwise forming spacers 33.

After forming spacers 33, equipment 58 may deposit a ring of sealant 56 on the lower substrate among substrates 30. Equipment 58 may be, for example, a printing drum, an ink-jet printer, a computer-controlled positioner that dispenses a bead of sealant from a needle dispenser, or other sealant deposition equipment. Roller 60 may press layers 30 together. Spacers 33 may maintain a desired distance between layers 30. Sealant 56 may create a ring-shaped barrier that prevents outward lateral movement of liquid crystal material when liquid crystal material is introduced into the cavity formed between layers 30.

The surfaces of layers 30 may be coated with a conductive material to form electrodes 32. For example, layers 30 may be coated with silver nanowires before processing with equipment 50, 56, and 60. The silver nanowires may have a diameter of 25-100 nm, more than 30 nm, or less than 200 nm (as example). The lengths of the nanowires may be 0.1 to 100 microns, 1-20 microns, more than 3 microns, less than 15 microns, or other suitable length. Silver nanowire electrode structures may be highly conductive and flexible. The concentration of the silver nanowires in electrodes 32 may be sufficiently low to prevent undesired haze in modulator 16. The thickness of the silver nanowire layer that forms electrodes 32 may be, as an example, less than 0.1 microns. The inner surfaces of electrodes 32 may be coated with a layer of dielectric that serves to orient liquid crystals 34 in the absence of an applied electric field. This inner dielectric coating layer, which may sometimes be referred to as a rubbing layer, may be formed from a polymer such as polyimide (as an example).

Figure 6:
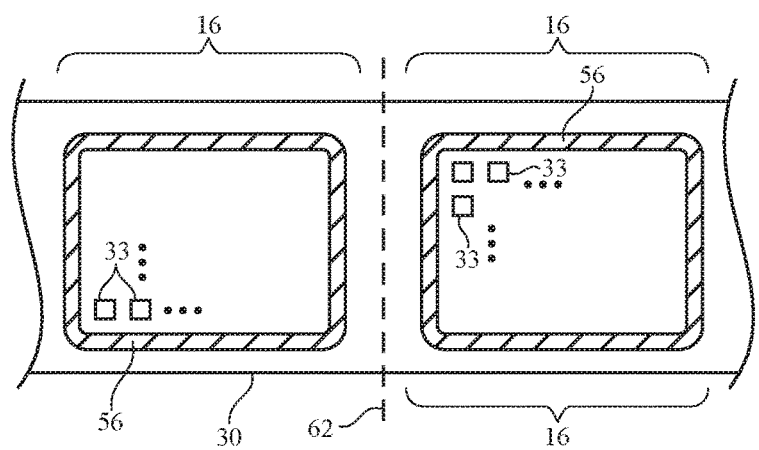
FIG. 6 is a top view showing edge sealant patterns that may be used when fabricating guest-host liquid crystal modulators using equipment of the type shown in FIG. 5 in accordance with an embodiment.

After processing using the roll-based equipment of FIG. 5, modulators 16 may be singulated from the resulting roll of flexible substrate 30 that exits drum 16 (i.e., modulators 16 may be singulated from a roll of substrate by forming cuts along cut lines such as cut line 62 of FIG. 6).

Figure 7:
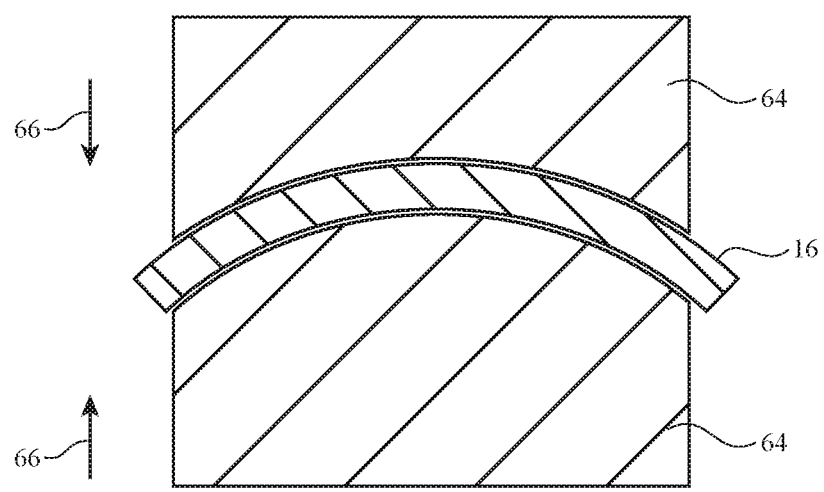
FIG. 7 is a cross-sectional side view of a compression molding tool being used to shape a liquid crystal light modulator in accordance with an embodiment.

Heated press structures such as compression mold 64 of FIG. 7 may be moved towards each other in directions 66 when it is desired to mold the material of substrates 30 into a desired shape. In the example of FIG. 7, mold 64 has compound curvature, which causes the thermoplastic material of substrates 30 to be molded into a shape with a compound curvature (e.g., a shape with one or more surfaces of compound curvature). Other types of shapes may be used for mold 64, if desired.

Figure 8:
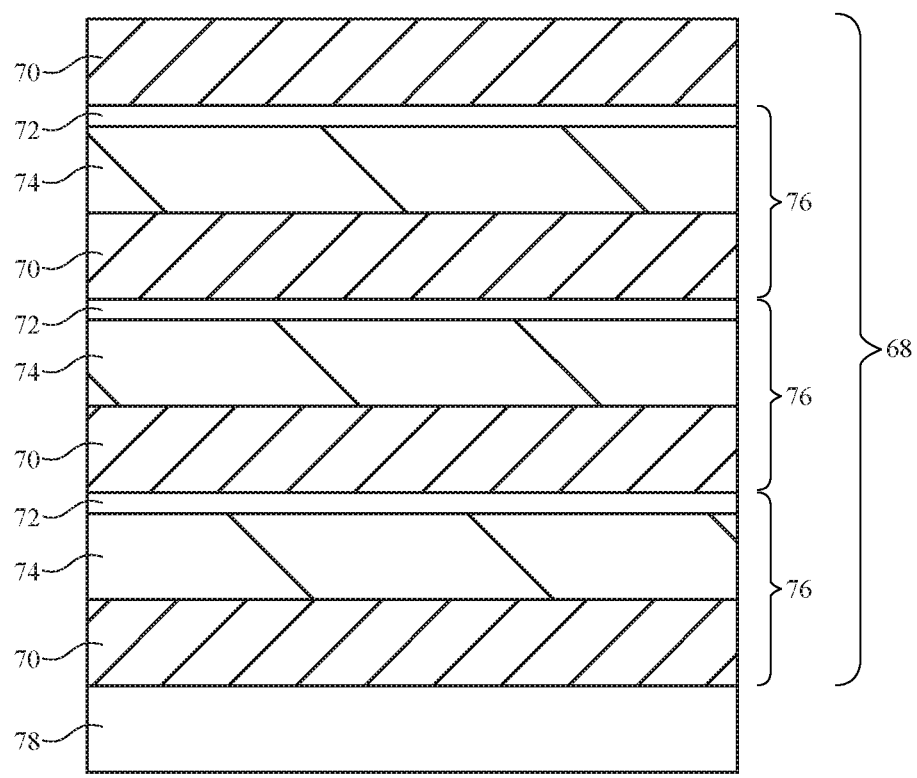
FIG. 8 is a cross-sectional side view of an illustrative three-metal-layer low-e layer for a window or other planar transparent layer with a liquid crystal modulator in accordance with an embodiment.

Window 28 may include multiple laminated layers of material (e.g., glass, plastic, modulator 16, etc.). With one suitable arrangement, an inner layer of material in window 28 may be formed from a low-emissivity ("low-e") layer. An illustrative low-e layer for window 28 is shown in FIG. 8. Low-e layer 68 may be formed on a glass substrate or other suitable substrate and may be incorporated into window 28 with one or more other layers such as the layers of modulator 16).

Low-e layer 68 has a stack with multiple layers such as layers 76 and may be formed on a substrate such as substrate 78 (e.g., a glass layer in window 28). Each layer 76 in the stack may include a seed layer such as seed layer 70 (e.g., a crystalline oxide layer such as a layer of zinc oxide), a metal layer on the seed layer such as layer 74 (e.g., a silver layer), and a protective layer on the metal layer such as layer 72. Protective layer 72 may be formed from a material that helps prevent diffusion of silver from layer 74 into the zinc oxide of seed layer 70. Layer 72 may be formed from titanium (e.g., as with LoE³-366® glass from Cardinal Glass Industries), or may be formed from a transparent oxide such as titanium oxide ($TiO_2$). The use of transparent oxide barrier layers in low-e layer 68 may help increase visible light transmission (e.g. to a value above 80%, above 85%, above 90%, or above 95%).

During fabrication, layers of material may be deposited on substrate 78 in sequence. Initially a crystalline seed layer such as layer 70 may be deposited. The seed layer may be formed from a crystalline oxide such as zinc oxide or other material that serves as a suitable base layer for subsequent crystalline silver deposition. The deposited seed layer 70 may have a thickness of about 11 nm (10-15 nm, less than 15 nm, more than 10 nm, etc.) and may be deposited using sputter deposition or other suitable deposition techniques.

Following deposition of seed layer 70, metal layer 74 may be deposited on seed layer 70. Metal layer 74 may be formed from silver or other suitable metal and may have a thickness of about 10-20 nm, more than 10 nm, less than 20 nm, etc. Sputter deposition techniques or other deposition techniques may be used when depositing layer 74.

Silver has the potential of becoming damaged when exposed to oxygen. The risk of damage will be elevated when the deposited silver has a rough surface morphology. By forming a thin layer, layer 74 may be crystalline and may exhibit a smooth surface morphology suitable for supporting the growth of additional smooth crystalline layers of material for layer 68.

After depositing the first silver layer 74, a barrier film such as protective layer 72 of may be deposited. Protective layer 72 may be a crystalline layer of titanium oxide (e.g., titanium dioxide) that exhibits a close lattice match to zinc oxide layer 70 and silver layer 74 and that serves to protect silver layer 74 from damage during subsequent layer deposition steps (e.g., when sputter depositing additional seed layers). Layer 72 may be deposited using a technique such as atomic layer deposition that allows layer 72 to be accurately deposited to a thickness of about 2 nm (e.g., about 10-20 atomic layers) without damaging silver layer 74 (as an example). Layer 72 may, for example, have a thickness of less than 3 nm, less than 5 nm, more than 1 nm, 1-5 nm, 1-3 nm, or other suitable thickness. If desired, other deposition techniques may be used (e.g., sputtering) and/or other materials may be used to form protective layer 72 (e.g., titanium, ZnAlO, silicon oxide, silicon nitride, etc.). An advantage of using titanium oxide rather than materials such as titanium is that transmission for layer 68 may be enhanced (e.g., visible light transmission may be increased from about 70% to about 85-90%).

After depositing protective layer 72 in the first of layers 76 on substrate 78, the formation of that layer is complete. Subsequent layers 76 may then be formed in the same way (and may, if desired, be covered with a zinc oxide layer or other suitable layer).

The thicknesses of the layers in film 68 may be selected to produce desired thin-film interference effects and visible light absorption effects (e.g., to create a visible pass band and low transmission in near infrared and far infrared wavelengths).

If desired, different numbers of metal layers 74 (e.g., three or more, four or more, five or more, fewer than five, etc.) may be used in film 68. Barrier layer 72 also need not be formed from a separate layer of material. With the illustrative two-metal-layer configuration for low-e film 68 of FIG. 9, there are two metal layers 74. Barrier layers 70' may be formed by depositing an initial portion (e.g., 10-15 nm) of the zinc oxide of each layer 70 in the absence of gaseous oxygen. In this way, this initial portion (portion 70') of each zinc oxide layer can serve as a barrier layer that prevents oxygen (e.g. oxygen that is present during the deposition of subsequent portions of each layer 70) from diffusing into underlying silver in layers 74. The incorporation of gaseous oxygen into the upper portions of each zinc oxide layer may help ensure that visible light transmission is maximized.

Figure 9:
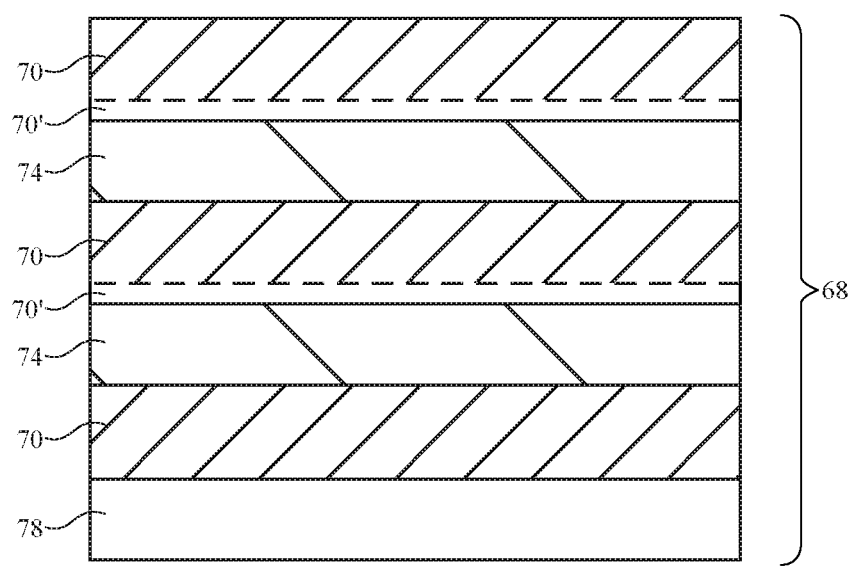
FIG. 9 is a cross-sectional side view of an illustrative two-metal-layer low-e layer for a window or other planar transparent layer with a liquid crystal modulator in accordance with an embodiment.
Figure 10:
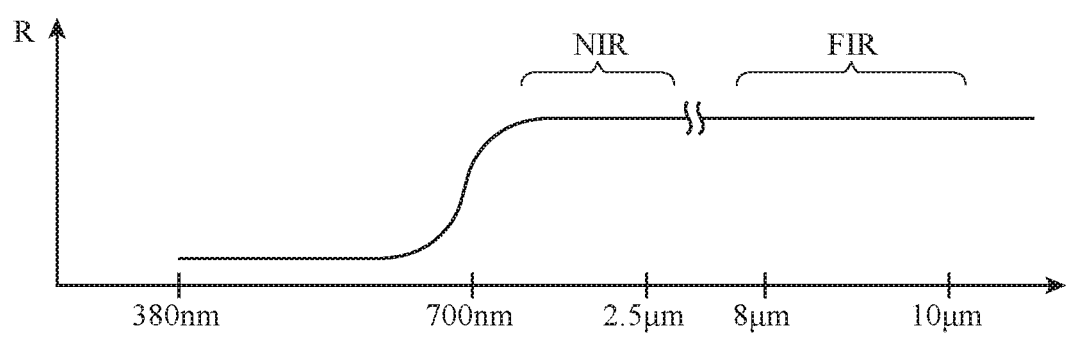
FIG. 10 is a graph in which light reflectivity for a window or other planar transparent layer with a low-e layer has been plotted as a function of wavelength in accordance of the present invention.

Using a low-e layer such as one of the illustrative low-e layers 68 of FIGS. 9 and 10 or other low-e layer, the low-e layer portion of window 28 may be characterized by a reflectivity spectrum of the type shown in FIG. 10. As shown in FIG. 10, layer 68 may have a reflectivity R that is low in the visible light portion of the spectrum (e.g., from 380 nm to about 700-780 nm), and that rises (starting at about 700 nm) to a high reflectivity value in near infrared wavelengths (e.g., NIR wavelengths of about 700 nm to 2.5 microns) and far infrared wavelengths (e.g. FIR wavelengths of about 8 microns to 10 microns). Solar radiation includes light in near infrared wavelengths, so the ability to reflect light (and therefore not transmit light) at near infrared wavelengths helps prevent solar radiation from heating interior 22. Visible light that is blocked by absorption in modulator 16 may be converted to heat (e.g., far infrared light at 8-10 microns), so the ability to reflect (and not transmit) light at far infrared wavelengths may also help prevent heating of interior 22. Visible light may be transmitted or blocked by modulator 16 depending on whether it is desired to allow visible light to illuminate and heat interior 22. Ultraviolet light may be absorbed and/or reflected by layers such as layer 68, UV-blocking coating layers in window 28, and/or stand-alone UV-blocking filter layers (e.g., a filter layer placed between an outer glass layer in window 28 and modulator 16).

Figure 11:
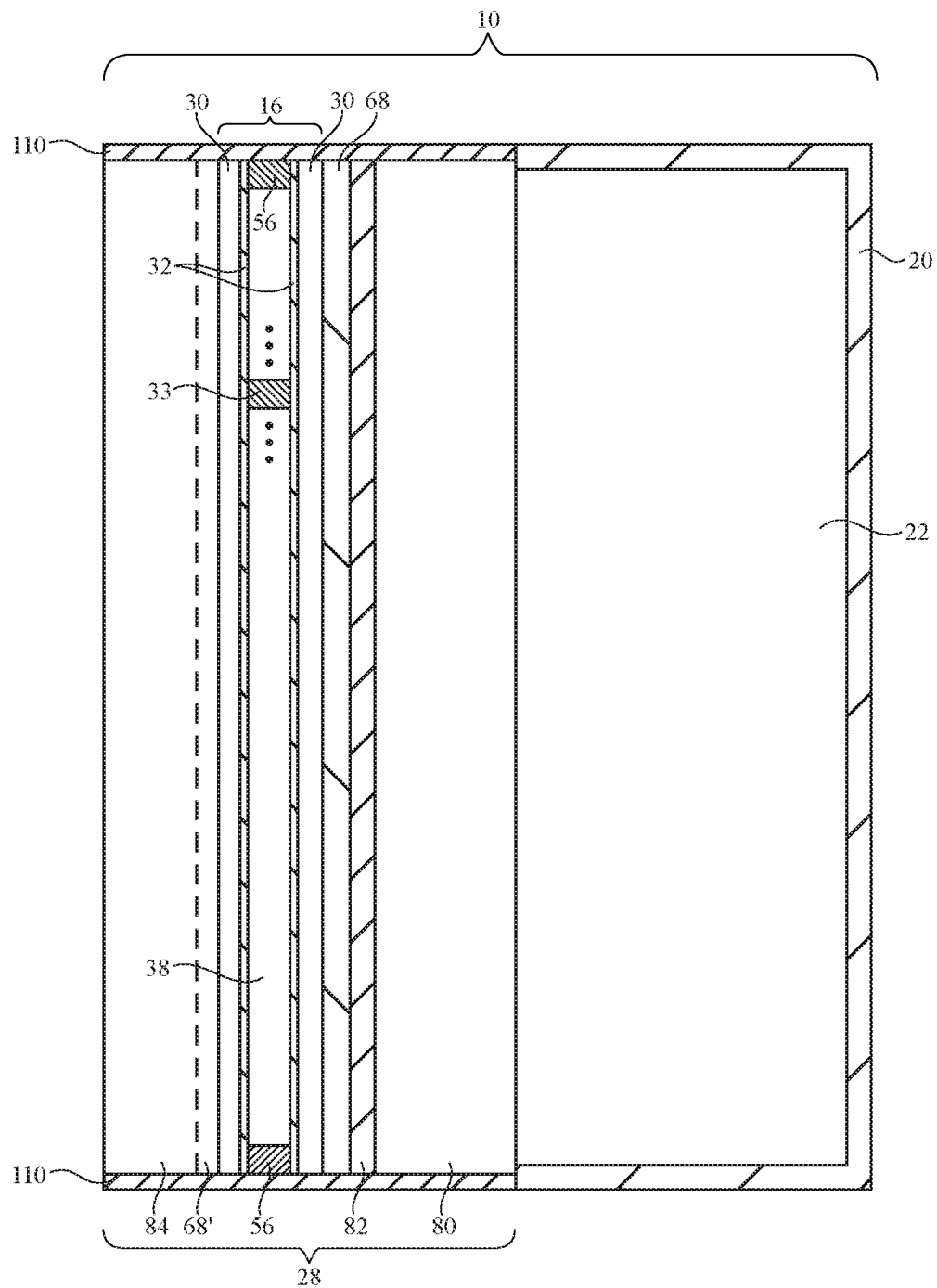
FIG. 11 is a cross-sectional side view of an illustrative system with a window having a light modulator and a low-e layer that serves as an interface between an interior portion of the system and the exterior environment surrounding the system in accordance with an embodiment.

FIG. 11 is a cross-sectional side view of an illustrative window in system 10. As shown in FIG. 11, window 28 may have one or more glass layers such as inner glass layer 80 and outer glass layer 84. The edges of glass layers 80 and 82 and the intervening layers of material between layers 80 and 82 may be sealed using epoxy, silicone, or other sealant 110 (e.g., to prevent intrusion of oxygen that may degrade the materials of window 28). Glass layers 80 and 84 may have thicknesses of about 2-3 mm, less than 3 mm, more than 1 mm, or other suitable thickness. Layers such as interlayer 82 may be formed from polymer and may exhibit strong binding properties and high optical clarity. Layer 82 may be, for example, a layer of polyvinyl butyral or ethylene-vinyl acetate. There may be two or more glass layers, three or more glass layers, or other suitable number of glass layers such as layers 80 and 84 in window 28. Interlayers 82 may be used to form a laminated glass structure from layers such as layers 80 and 84 that serves as safety glass for window 28.

Guest-host liquid crystal light modulator 16 may be incorporated into the stack of layers that forms window 28. For example, light modulator 16 may be sandwiched between outer glass layer 84 and inner glass layer 80. Optional infrared (IR) and ultraviolet (UV) blocking layers such as layer 68 may be interposed between modulator 16 and inner glass layer 80 (and, if desired, may be interposed between outer glass layer 84 and modulator 16 (as indicated by optional blocking layer 68', which may be a low-e layer and/or a UV blocking filter layer). The incorporation of UV-blocking structures in layer 68' may help prevent degradation of substrates 30 and other structures in window 28. Layers 68 of window 28 may be, for example a layer that includes low-e structures of the type shown in FIGS. 8 and 9 and/or other low emissivity structures to reflect solar radiation and to reflect heat generated in modulator 16. Low emissivity structures may also be used for optional layer 68'.

Figure 12:
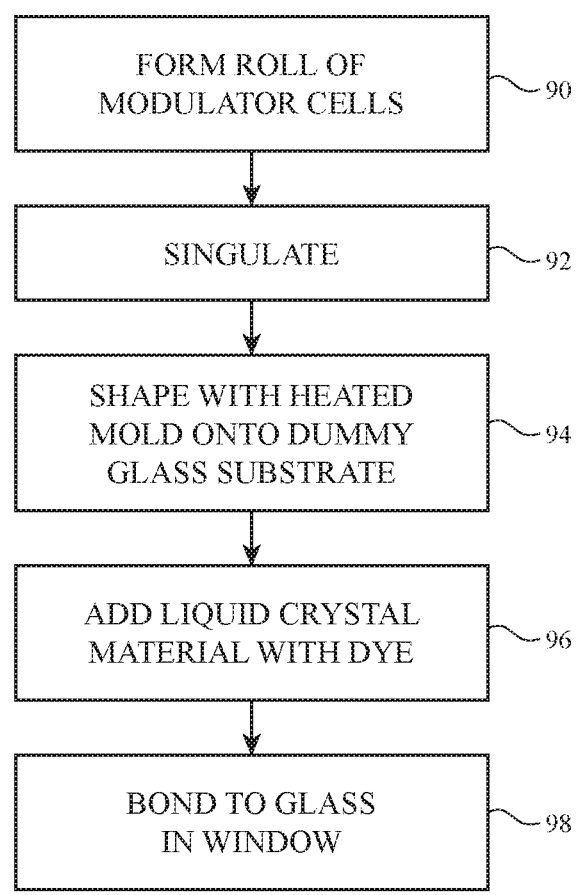
FIG. 12 is a flow chart of illustrative steps involved in forming a window with a light modulator in accordance with an embodiment.

Illustrative steps in forming window 28 are shown in FIG. 12.

At step 90, equipment of the type shown in FIG. 5 may be used to form a roll of light modulator cells.

At step 92, the roll of modulator cell structures that has been formed using the roll-based processing equipment of FIG. 5 or other suitable processing equipment may be singulated to form individual modulator cells (see, e.g., modulator cells 16 of FIG. 6).

Before filling the empty modulator cells produced during the singulation operations of step 92, molding equipment of the type shown in FIG. 7 (e.g., mold 64) may be used to shape substrates 30 and the other structures of modulators 16 into a desired shape (e.g., a shape with compound curves). If desired, a dummy glass substrate may serve as part of mold 64 and may help ensure that modulator 16 is shaped into a desired shape. When heated, the material of substrates 30 may shrink (e.g., heat shrink) onto the surface of the dummy glass substrate or other mold structure.

At step 96, after forming light modulator structures 16 into a desired shape, liquid crystal material 38 (e.g., a liquid containing liquid crystal molecules 34 and dye molecules 36) may be introduced into the cavity formed between the opposing substrate layers 30 in the empty light modulator structures. Needle injection or other liquid crystal filling techniques may be used to fill each modulator 16 with liquid crystal material. After liquid crystal material 38 has been introduced into each modulator 16, that modulator will be able to serve as a light modulator in window 28. If desired, liquid crystal material 38 may be introduced into the cavity between substrate layers 30 before molding substrates 30 into a desired shape with mold 64. The arrangement of FIG. 12 in which substrates 30 are molded before being filled with material 38 is merely illustrative.

At step 28, lamination techniques may be used to form window 28 from layers of glass, layers such as low-e layer 68, and interlayer 82 (e.g., lamination at a temperature of about 140° C. when using a polyvinyl butyral layer as layer 82 to bind window layers together).

Figure 13:
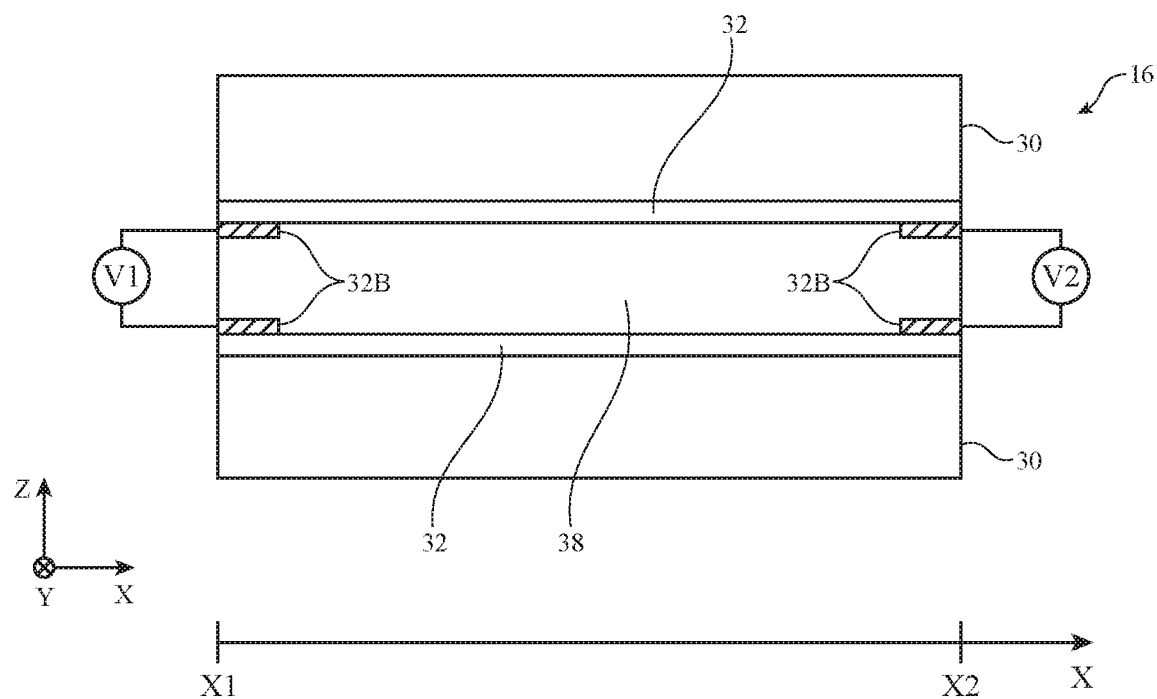
FIG. 13 is a diagram showing how a light modulator for a window may be provided with elongated terminals that allow light transmission gradients to be formed within the light modulator in accordance with an embodiment.

If desired, guest-host liquid crystal light modulator 16 in window 28 may be provided with terminals on electrodes 32. The terminals may be provided along the edges of electrodes 32 or on other portions of electrodes 32 and may be supplied with different voltages to allow light transmission to be varied across the surface of light modulator 16. As shown in FIG. 13, for example, light modulator 16 may be provide with strip-shaped terminals 32B that run along the edges of electrodes 32 (parallel with dimension Y and into the page in the orientation of FIG. 13). Terminals 32B may be formed from thick layers of transparent conductive material such as indium tin oxide and/or may be formed from metal. The sheet resistance of terminals 32B may be less than the sheet resistance of electrodes 32, so that there is minimal voltage drop along the lengths of terminals 32B. The sheet resistance of electrodes 32 may be higher to allow voltages to drop gradually across the surface of light modulator 16.

Figure 14:
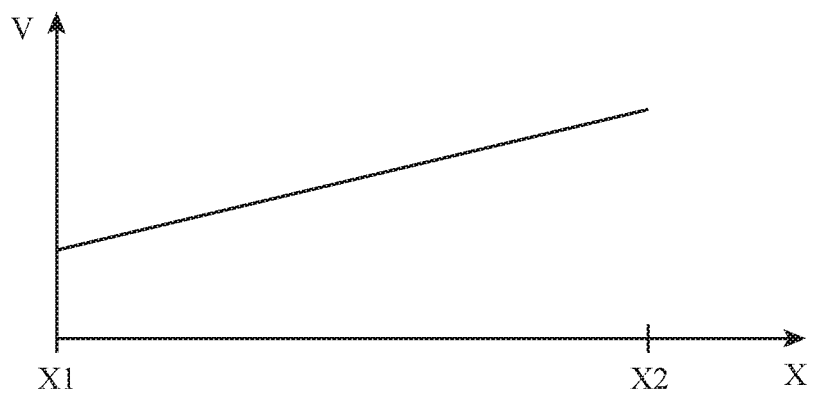
FIG. 14 is a graph of an illustrative control voltage that may be established across the light modulator of FIG. 13 in accordance with an embodiment.
Figure 15:
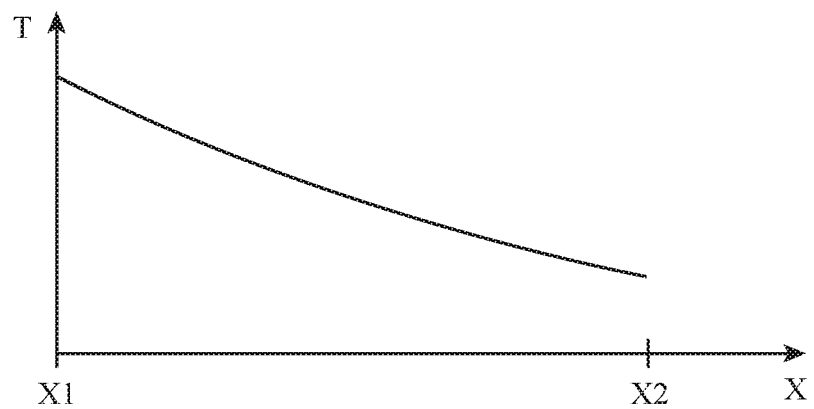
FIG. 15 is a graph showing how the light modulator of FIG. 13 may exhibit a transmission gradient when controlled using a control voltage of the type shown in FIG. 14 in accordance with an embodiment.

With the illustrative configuration of FIG. 13, a first control voltage V1 may be applied to electrodes 32 along the left edge of electrodes 32 and a second control voltage V2 may be applied to electrodes 32 along the right edge of electrodes 32. Between the left-hand and right-hand terminals 32B voltage V varies between voltage V1 and voltage V2 due to the resistance of electrodes 32. If, for example, V1 is less than V2, the voltage V across liquid crystal layer 38 may vary linearly as a function of position X across light modulator 16, as shown in FIG. 14. This results in a gradient in light transmission T through modulator 16 of the type shown in FIG. 15. Voltages V1 and/or V2 may be varied in real time to create motion effects (e.g., window darkening effects that mimic a physical sunshade being raised or lowered in window 28 or other suitable motion in the light transmission through modulator 16).

Figure 16:
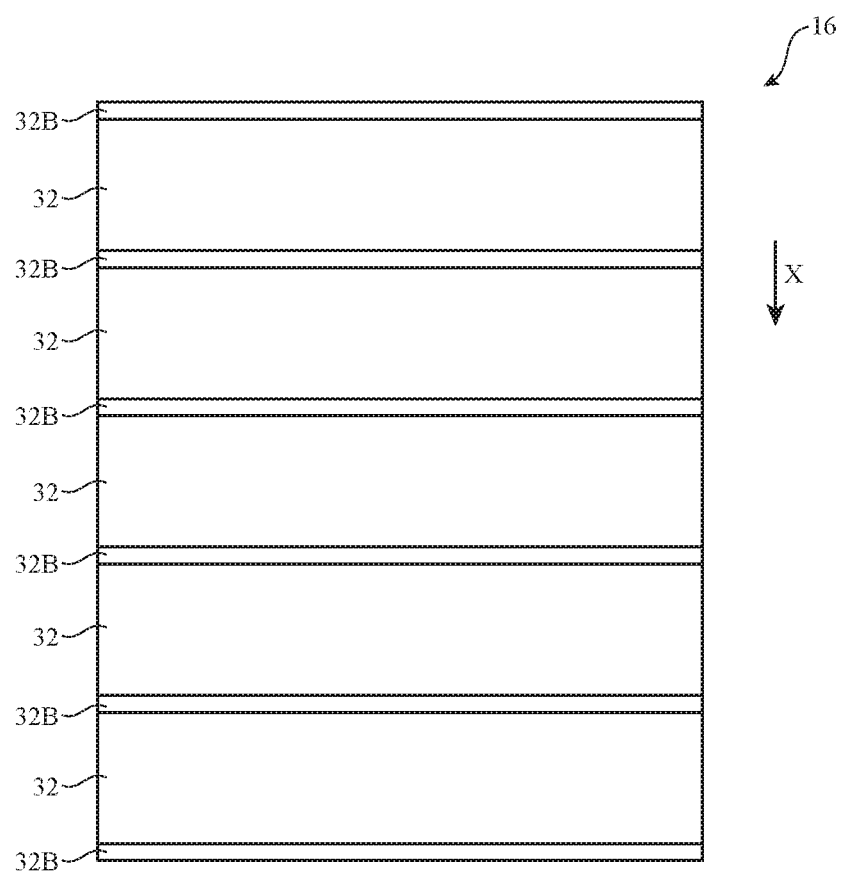
FIG. 16 is a diagram of an illustrative light modulator electrode arrangement with strip-shaped terminals that divide an electrode into multiple bands in accordance with an embodiment.
Figure 17:
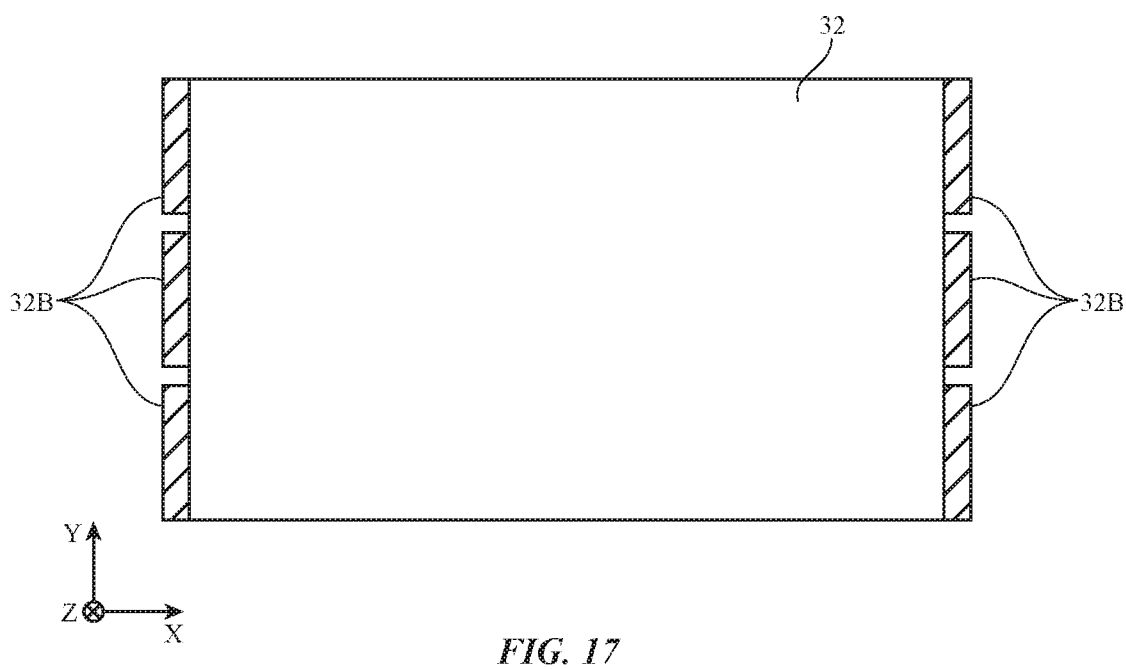
FIG. 17 is a diagram of another illustrative light modulator electrode arrangement in accordance with an embodiment.

If desired, terminals 32B may be provided with other configurations. For example, a series of terminals 32B may span electrode 32 at different positions X across modulator 16, thereby allowing different sections of light modulator 16 to be provided with individually controllable gradients (see, e.g., FIG. 16 in which electrode 32 has been spanned by six different strip-shaped terminals 32B). Each of terminals 32B may be provided with an independently adjustable voltage or sets of two or more of terminals 32B may be driven using shared control voltage signals. In the example of FIG. 17, terminals 32B have been segmented along the edges of electrodes 32 to provide additional light transmission adjustability across the surface of modulator 16 in the X-Y plane. In general, electrodes 32 may be provided with any suitable number of terminals 32B (e.g., two or more, three or more, four or more, 5-10, more than 10, fewer than 20, etc.). The examples of FIGS. 13, 16, and 17 are merely illustrative.

Figure 18:
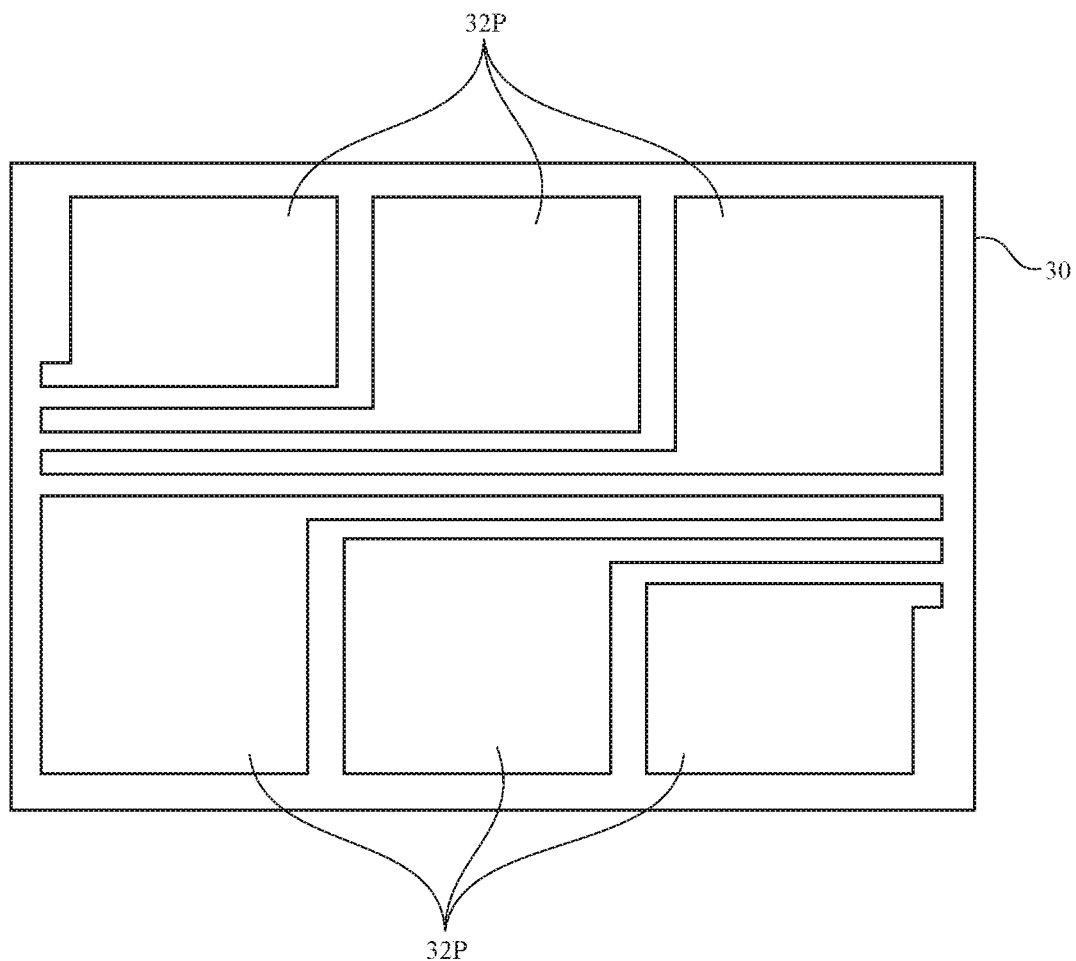
FIG. 18 is a diagram of an illustrative pixelated electrode for a light modulator to control light transmission through a window in adjustable patterns in accordance with an embodiment.

In addition to or instead of adding terminals 32B to electrode 32, electrode 32 may be patterned to form individually adjustable electrode pixels 32P, as shown by the pixelated electrode configuration of FIG. 18. Pixels 32P may be relatively large (e.g., multiple centimeters in width or larger) to minimize control complexity or may be smaller (e.g., millimeter sized or less) to allow images or other information to be displayed with modulator 16.

Figure 19:
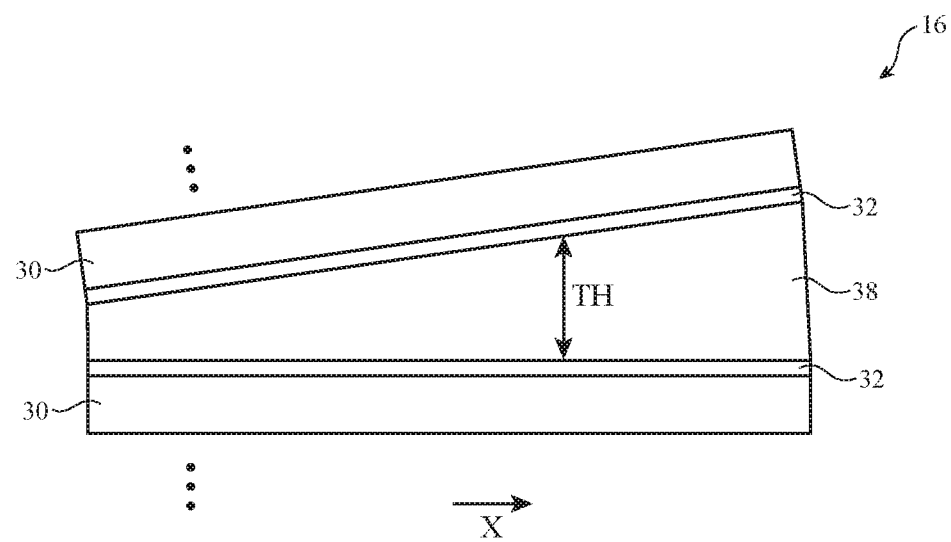
FIG. 19 is a cross-sectional side view of an illustrative light modulator having a varying liquid crystal layer thickness in accordance with an embodiment.
Figure 20:
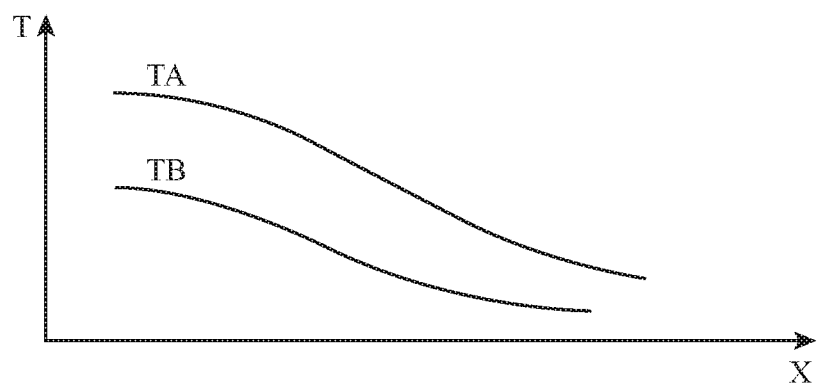
FIG. 20 is a graph of illustrative light transmission characteristics associated with the light modulator of FIG. 19 in on and off states in accordance with an embodiment.

FIG. 19 shows how the thickness TH of liquid crystal layer 38 may be varied as a function of position X across light modulator 16. This type of arrangement may result in a light transmission gradient for modulator 16 when modulator 16 is in its off state, as shown by light transmission curve TB of FIG. 20. When modulator 116 is turned on (i.e., when a drive voltage is applied to electrodes 32), light transmission for modulator 16 of FIG. 19 may change to the transmission of curve TA (as an example). In general, light modulator 16 may have a normally dark or a normally light state, as determined by the alignment of the liquid crystals in layer 38 in the presence and absence of applied voltages on electrodes 32. In the example of FIGS. 19 and 20, modulator 16 exhibits more light transmission (curve TA) when a voltage is applied than when the voltage is removed (light transmission curve TB). This is merely illustrative. In general, light modulator 16 may be normally on, may be normally off, or may have some regions that are normally on and some regions that are normally off.

Light modulator 16 may have polymer alignment layers (sometimes referred to as liquid crystal alignment layers) on the surfaces of electrodes 32 facing liquid crystal layer 38. The alignment directions associated these alignment layers help establish desired alignment directions for the liquid crystals of layer 38 in the absence of applied voltages. Alignment layers may be configured by exposing the polymer of the alignment layers (e.g., polyimide) to polarized ultraviolet light with a controlled polarization orientation. This allows the liquid crystals of layer 38 to be arranged in any one of a variety of different possible configurations. Examples of liquid crystal configurations that may be used for light modulator 16 include an electrically controlled birefringence (EBC) mode, a vertical alignment mode, a super twisted nematic mode, and a reverse twisted nematic mode.

In the electrically controlled birefringence mode, the upper and lower alignment layers have alignment directions that are parallel to each other (in the X-Y plane). When no voltage is applied, the liquid crystals and dye molecules of layer 38 are horizontal (parallel to the surfaces of electrodes 32) and light is absorbed (the modulator is dark). When voltage is applied, the liquid crystals and dye molecules are oriented vertically across the thickness of layer 38 and the modulator is clear.

In the vertical alignment mode, the modulator is normally clear. The top and bottom alignment layers can be used to vertically align the liquid crystal molecules and dye molecules in the absence of applied voltage. When voltage is applied, the modulator becomes dark.

In the super twisted nematic arrangement, there is a 270° twist in the liquid crystal and dye molecules (as a function of distance across the thickness of layer 38). This forms a helical shape for the liquid crystal and dye molecules. In the absence of applied voltage, the super twisted nematic light modulator is dark. In the presence of applied voltage, the transmission of the super twisted nematic light modulator increases.

In the reverse twisted nematic arrangement applied voltage can be varied so that the liquid crystals and dye molecules are either aligned vertically (perpendicular to the surface normal of planar electrodes 32) and are transparent or are aligned horizontally and are opaque (and are twisting 90° when transitioning between lower and upper electrodes due to a perpendicular arrangement between the orientations of the upper and lower alignment layers).

Figure 21:
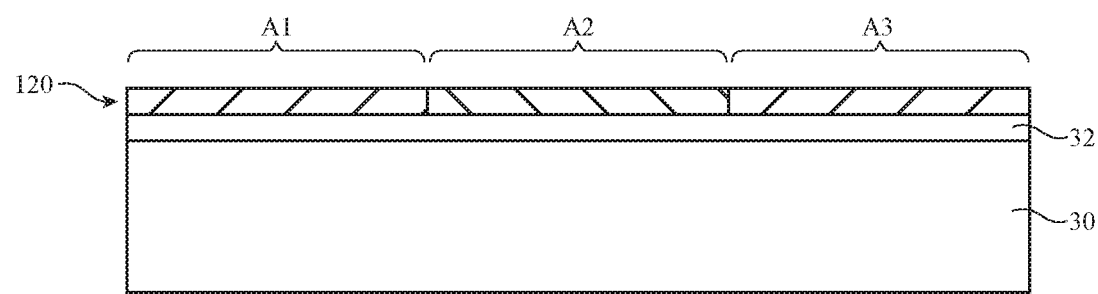
FIG. 21 is a cross-sectional side view of an illustrative light modulator electrode showing how a liquid crystal alignment layer may be patterned in accordance with an embodiment.

The alignment layer(s) on electrode(s) 32 can be aligned differently in different regions of modulator 16 (e.g., by selective application of a polarized ultraviolet light source with various orientations to the alignment layers during fabrication) to create light transmission characteristics for modulator 16 that vary as a function of position. This type of arrangement is shown for the lower electrode 32 in a light modulator in the cross-sectional side view of FIG. 21. In the FIG. 21 example, alignment layer 120 has been deposited on electrode 32 on substrate 30. Photo-exposure has caused region A1 of layer 120 to have a first alignment, region A2 to have a second alignment (e.g., an alignment direction that is at a non-zero angle with respect to the alignment direction of area A1), and region A3 to have a third alignment (e.g., an alignment direction that differs from both that of region A1 and that of region A2). Three different alignments are present in alignment layer 120 of FIG. 21, but, in general, alignment layers on electrodes 32 may have any suitable number of potentially differently aligned alignment areas (e.g., 2-10, more than 5, more than 10, more than 20, fewer than 100, etc.). Alignment directions may be varied continuously and gradually across a single dimension such as dimension X (e.g., to create a smooth light transmission gradient for modulator 16 in the absence of applied voltage), and/or may be varied in a stepwise fashion (e.g., to create some areas that are normally dark and other areas that are clear or gray). Combinations of these arrangements may also be used. In general, any suitable pattern of alignment directions may be created in respective regions of alignment layers such as alignment layer 120 of FIG. 21 (e.g., gradient patterns, stripe patterns, checkerboard patterns, patterns associated with text, logos, or other images, decorative trim patterns, a horizontal stripe along the upper edge of the front window of a vehicle that serves as a sunshade, etc.). Alignment layer patterning to create desired patterns of regions with different respective liquid crystal alignment directions may be used in combination with any desired pattern of electrode terminals 32B and/or any desired variation in liquid crystal layer thickness TH (see, e.g., FIG. 19). These techniques may be used for modulators 16 in windows 28 with desired light blocking and transmission properties. In addition, modulators 16 may include stacked modulator cells.

Figure 22:
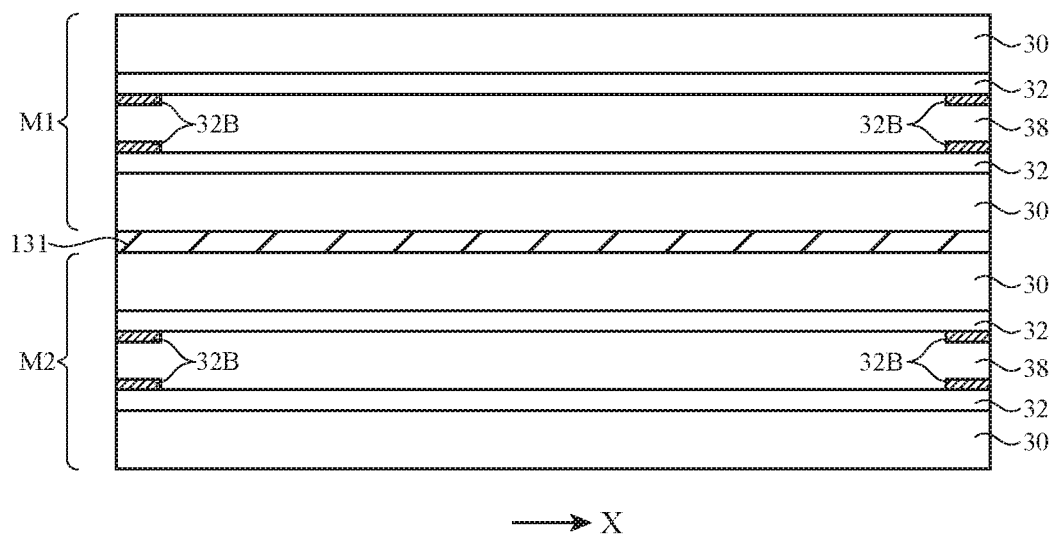
FIG. 22 is a cross-sectional side view of an illustrative stacked light modulator having a pair of stacked light modulator cells in accordance with an embodiment.
Figure 23:
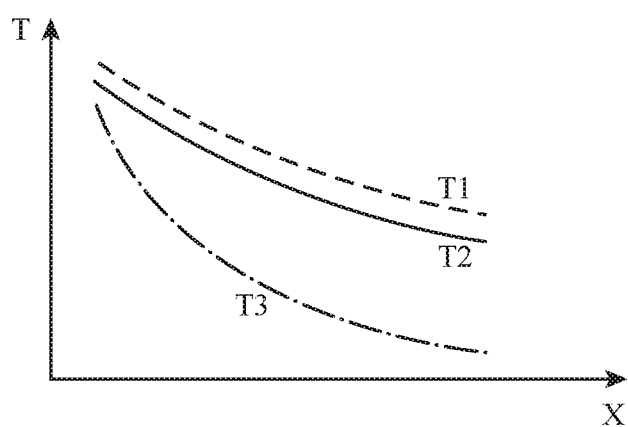
FIG. 23 is a graph of illustrative light transmission characteristics for the cells and stacked light modulator of FIG. 22 in accordance with an embodiment.

FIG. 22 is a cross-sectional side view of an illustrative stacked light modulator. Stacked light modulator 16 of FIG. 22 includes an upper light modulator cell (light modulator M1) and a lower light modulator cell (light modulator M2) that have been joined by optically clear adhesive layer 131. During operation, the light transmission characteristic of modulator 16 is determined by the combined light transmission characteristics of modulators M1 and M2. As shown in the example of FIG. 23, light modulator M1 may have a transmission T1, light modulator M2 may have a transmission T2, and light modulator 16 may have transmission T3 that is equal to the product of T1 and T2. By using multiple stacked modulators (e.g., two or more, three or more, four or more, etc.), desired light transmission patterns (gradients, etc.) may be produced by light modulator 16.

The foregoing is merely illustrative and various modifications can be made to the described embodiments. The foregoing embodiments may be implemented individually or in any combination.

What is claimed is:

1. A system, comprising:
   structures that form an interior region that is separated from an exterior region; and
   a window in the structures that is interposed between the interior region and the exterior region, wherein the window includes:
      a guest-host liquid crystal light modulator; and
      a layer configured to block infrared light emitted by the guest-host liquid crystal light modulator, wherein the layer that is configured to block the infrared light comprises:
         a metal layer,
         a metal oxide barrier layer that directly contacts the metal layer, and
         a crystalline oxide seed layer that directly contacts the metal oxide barrier layer, wherein the metal oxide barrier layer is interposed between the crystalline oxide seed layer and the metal layer.

2. The system defined in claim 1 wherein the layer that is configured to block the infrared light comprises at least two metal layers.

3. The system defined in claim 1 wherein the metal layer comprises a silver layer.

4. The system defined in claim 3 wherein the crystalline oxide seed layer comprises zinc oxide.

5. The system defined in claim 1 wherein the window further comprises at least one glass layer and a polymer layer on the glass layer that is interposed between the layer that is configured to block the infrared light and the glass layer.

6. The system defined in claim 1 wherein the guest-host liquid crystal light modulator comprises dichroic dye.

7. The system defined in claim 6 wherein the dichroic dye comprises a mixture of azo dye and anthraquinone dye.

8. The system defined in claim 1 wherein the window further comprises first and second glass layers, wherein the guest-host liquid crystal modulator is interposed between the first and second glass layers.

9. The system defined in claim 8 further comprising an ultraviolet light blocking filter layer between the first glass layer and the guest-host liquid crystal modulator.

10. The system defined in claim 1 wherein the light emitted by the guest-host liquid crystal light modulator comprises light with wavelengths from 8 microns to 10 microns, wherein the layer that is configured to block infrared light emitted by the liquid crystal light modulator is configured to block the light with the wavelengths from 8 microns to 10 microns and is configured to block near-infrared light with wavelengths from 700 nm to 2.5 microns.

11. The system defined in claim 1 wherein the guest-host liquid crystal light modulator has pixelated transparent electrodes.

12. The system defined in claim 1 wherein the guest-host liquid crystal light modulator has first and second polymer substrates and wherein the first and second polymer substrates comprise thermoplastic material that is configured to be molded to form a shape with compound curves.

13. The system defined in claim 1 wherein the guest-host liquid crystal light modulator has a layer of liquid crystal molecules and dye molecules interposed between first and second transparent conductive electrodes and wherein the layer of liquid crystal molecules and dye molecules has a thickness that varies across the guest-host liquid crystal light modulator.

14. The system defined in claim 1, wherein the metal oxide barrier layer comprises titanium.

15. The system defined in claim 14, wherein the metal oxide barrier layer comprises titanium oxide, the metal layer comprises silver, and the crystalline oxide seed layer comprises zinc oxide.

16. A system, comprising:
structures that form an interior region that is separated from an exterior region; and
a window in the structures that is interposed between the interior region and the exterior region, wherein the window includes:
a guest-host liquid crystal light modulator; and
a layer configured to block infrared light emitted by the guest-host liquid crystal light modulator, wherein the guest-host liquid crystal light modulator has a layer of liquid crystal molecules and dye molecules interposed between first and second transparent conductive electrodes, wherein the guest-host liquid crystal light modulator has metal terminals that run along at least first and second edges of the transparent conductive electrodes, and wherein the metal terminals are configured to concurrently apply different voltages to the first and second edges that produce a voltage across the guest-host liquid crystal light modulator layer that varies linearly as a function of position along the first and second transparent conductive electrodes, the layer comprising:
a metal layer,
a metal oxide barrier layer that directly contacts the metal layer, and
a crystalline oxide seed layer that directly contacts the metal oxide barrier layer, wherein the metal oxide barrier layer is interposed between the crystalline oxide seed layer and the metal layer.

17. The system defined in claim 16, wherein the metal layer comprises silver, the metal oxide barrier layer comprises titanium oxide, and the crystalline oxide seed layer comprises zinc oxide.

18. A system, comprising:
structures that form an interior region that is separated from an exterior region; and
a window in the structures that is interposed between the interior region and the exterior region, wherein the window includes:
a guest-host liquid crystal light modulator; and
a layer configured to block infrared light emitted by the guest-host liquid crystal light modulator, wherein the guest-host liquid crystal light modulator has a layer of liquid crystal molecules and dye molecules interposed between first and second transparent conductive electrodes, wherein the guest-host liquid crystal light modulator has respective first and second liquid crystal alignment layers on the first and second transparent conductive electrodes, and wherein the first liquid crystal alignment layer has different regions with different respective alignment directions that establish alignment directions for the liquid crystal molecules in the absence of an applied voltage, the layer comprising:
a metal layer,
a metal oxide barrier layer that directly contacts the metal layer, and
a crystalline oxide seed layer that directly contacts the metal oxide barrier layer, wherein the metal oxide barrier layer is interposed between the crystalline oxide seed layer and the metal layer.

19. The system defined in claim 18, wherein the different respective alignment directions are varied in a stepwise fashion across a dimension of the guest-host liquid crystal light modulator.

* * * * *